Figure 1:
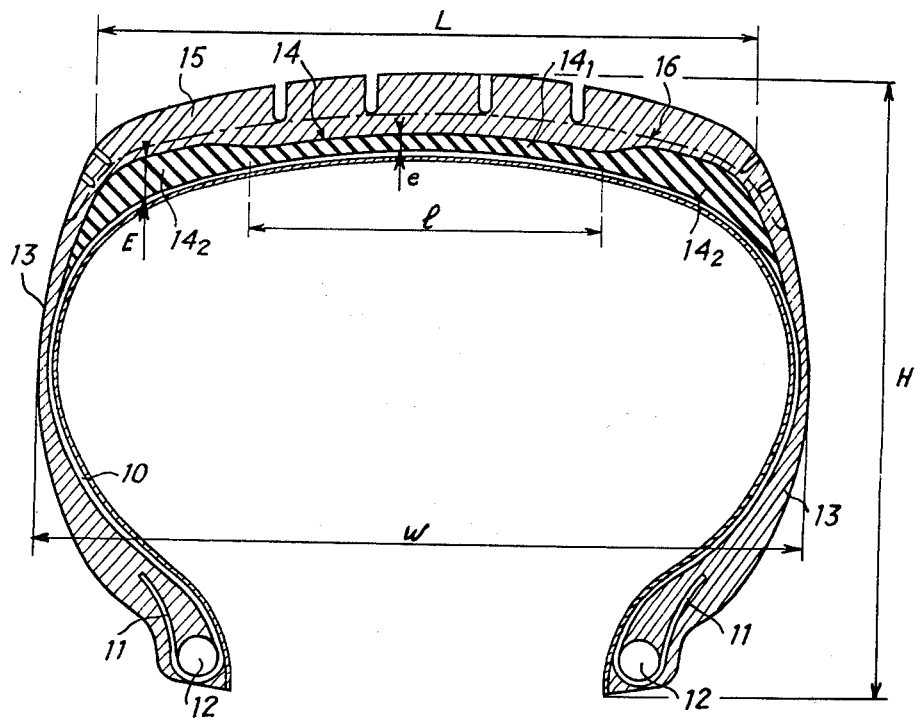

United States Patent [19]
Masson

[11] 3,916,968
[45] Nov. 4, 1975

[54] VEHICLE TIRES

[75] Inventor: Yves Masson, Paris, France

[73] Assignee: Pneumatiques, Caoutchouc Manufacture et Plastiques Kleber-Colombes, Paris, France

[22] Filed: Jan. 28, 1974

[21] Appl. No.: 436,864

[30] Foreign Application Priority Data
Jan. 29, 1973 France............................ 73.03118

[52] U.S. Cl. ....... 152/353; 152/361 R; 152/361 DM
[51] Int. Cl. ............................................ B60c 9/12
[58] Field of Search ....... 152/352, 352 A, 353, 354, 152/361 R, 361 DM, 374

[56] References Cited
UNITED STATES PATENTS

| | | | |
|---|---|---|---|
| 3,512,568 | 5/1970 | Delobelle........................ | 152/361 R |
| 3,543,828 | 12/1970 | Gaille Colombes et al..... | 152/361 R |
| 3,759,306 | 9/1973 | Greiner et al...................... | 152/374 |
| 3,773,096 | 11/1973 | Masson........................... | 152/374 X |

Primary Examiner—Allen N. Knowles
Assistant Examiner—Larry H. Martin
Attorney, Agent, or Firm—Brisebois & Kruger

[57] ABSTRACT

This invention relates to low-profile vehicle tires whose cross-sectional proportions of height to width are equal to or less than 0.8 to 1 and of the kind comprising a carcass having side-walls and a crown, a tread and a reinforcing breaker between the carcass crown and the tread. In the invention the breaker extends transversely for a width which is at least equal to the tread width and has a shallow central section and two deep lateral sections. The shallow central section has a width between half and two-thirds of the tread width and a substantially uniform depth not greater than three times the carcass crown depth. At least the lateral sections of the breaker are made of an anisotropic rubbery mixture having a very high modulus of elasticity in the circumferential direction of the tire. This modulus is greater than 15 kg/cm² at 10% extension. The depth of the lateral sections of the breaker is between two to three times the depth of the central section of the breaker.

9 Claims, 10 Drawing Figures

VEHICLE TIRES

The present invention relates to tires having a breaker layer which are particularly intended for fitting to high-speed road vehicles.

Because of increases in motor vehicle performance, the demands made on tires are becoming more severe, in particular as regards their handling qualities and ability to withstand damage on prolonged high speed runs. The present-day tendency to use low-profile belted tires in which the ratio between the depth and width of the tire is 0.8 or less on high speed cars makes some contribution to meeting these demands. Nevertheless, in tires in which the belt is formed by a number of layers of fabric made of metal or textile filaments which extend uniformly over a width approximately equal to the width of the tread, premature failure is often the result of the bonded joint parting at the edges of the belt, where the strains and heating encountered in use are more pronounced than in the outer parts of the tire. Various attempts have therefore been made to reinforce the lateral areas of the belt by adding extra reinforcing members such as narrow lateral strips. However, in addition to the complication resulting from adding these extra members, the crown of the tire as a whole is thus made more stiff, to the detriment of certain characteristics such as cushioning, heating-up in use, and the maximum possible cornering speed allowed by road adhesion.

With the general object of improving the strength of such belted tires and the various properties contributing to their handling qualities, the invention proposes, in the case of low-profile tires, to form the belt or breaker with a shallow central section which is resistant to circumferential extension but extremely flexible in the radial and transverse directions, this central section extending on either side in the area where the shoulders of the tire are situated into deep lateral sections formed from an anisotropic rubbery mixture which is relatively homogeneous but whose modulus of elasticity is nevertheless very high in the circumferential direction.

Accordingly, the invention consists in a low-profile vehicle tire whose cross-sectional proportions of height to width do not exceed 0.8 to 1, comprising a carcass having side-walls and a crown, a tread and a reinforcing breaker positioned between said carcass crown and said tread, said breaker extending transversely for a width at least equal to the width of said tread and having a shallow central section and two deep lateral sections, said shallow central section of said breaker having a width between half and two-thirds of the width of said tread, and a depth which is substantially uniform and is not greater than three times the depth of said carcass crown, and wherein at least said lateral sections of said breaker are made of an anisotropic rubbery mixture having a very high modulus of elasticity in the circumferential direction of said tire, said modulus of elasticity being greater than 15 kg/cm$^2$ at 10 percent extension, the depth of said lateral sections of said breaker being two to three times the depth of said central section of said breaker.

In order that the invention may be more clearly understood reference will now be made to the accompanying drawings in which FIGS. 1 to 10 show cross-sectional views of various embodiments of tire according thereto by way of example.

Referring now to the drawings in which like reference numerals refer to like parts, the tires in question contain a carcass 10 formed from one or more layers of weftless or only sparsely wefted "cord" fabric made of rayon, nylon, polyester, glass-fibre or metal filaments, the filaments being orientated along meridian planes of the tires. The ends 11 of the carcass layers are folded back around bead-wires 12 in the beads. The sides of the carcass are covered by side-wall bands 13 and on the crown it carries a belt or breaker 14 which is inextensible in the circumferential direction. Above this belt is situated a tread 15 which bears a pattern suitable for the use to which the tire is to be put.

The shape shown for the tires is their cross-sectional shape in the uninflated condition, i.e. the shape in which they are moulded. This shape is close to the characteristic shape of low-profile tires in which the ratio between the height H and the width (see FIG. 1), is equal to or less than 0.8 with the tread substantially flat or slightly curved in the transverse direction. Due to the circumferential inextensibility of the breaker 14 this shape changes hardly at all when the tires are inflated.

In accordance with the invention, the breaker 14 of the tires has a relatively shallow central section $14_1$ which extends at either side into deep lateral sections $14_2$ which are formed from an anisotropic rubbery mixture of homogenous appearance, the modulus of elasticity of which is, however, high in the circumferential direction.

The breaker 14 as a whole extends transversely for a width greater than the width L of the tread and its lower face is applied directly to the crown of the carcass with which it makes continuous contact from one edge to the other. The width $l$ of the shallow central section $14_1$ itself is distinctly less than L and may be between half and two thirds of L. The radial depth $e$ of the central section $14_1$ is substantially uniform and is no greater than three times the depth of the carcass itself so that the central area of the crown of the tire will remain flexible in the radial and transverse directions. The depth E of the lateral sections $14_2$ is greater and is equal to two or three times the depth $e$ of the central section $14_1$. The lateral section $14_2$ taper on both sides to merge progressively with the central section and the rounded parts of the carcass 10 closest to the shoulders of the tire. Generally speaking, the maximum depth of the lateral sections $14_2$ is such that these sections are situated at a slightly lower level than the depth 16 to which the recessed portions of the pattern of the tread 15 extend.

Figure 2:
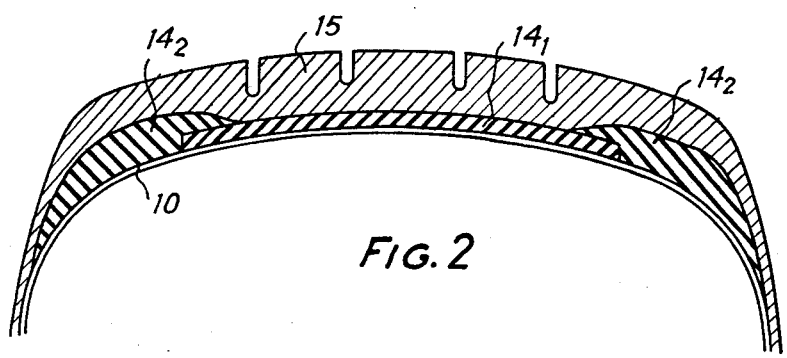

In the case of FIG. 1, the central section $14_1$ of the breaker 14 is made in one piece with the deep lateral sections $14_2$ by extrusion, the breaker 14 considered as a whole thus forming a shaped, thick-edged strip made throughout of the same anisotropic rubber mixture which has a very high modulus of elasticity. In the case of FIG. 2, the central section $14_1$ is a shallow flat strip bordered by two shaped extruded strips $14_2$. The strips can be brought together either during extrusion or when the tire is being manufactured, but in either case these different parts are welded together when the tire is vulcanised. However, in the case of FIG. 2, sections $14_1$ and $14_2$ may be formed from anisotropic rubbery mixtures having differing characteristics and compositions. In this way, the central strip $14_1$ may be made from an anisotropic rubbery mixture whose modulus of elasticity is extremely high only in the circumferential direction so that it is substantially inextensible, whereas its modulus of elasticity in the transverse direction is low so as to increase its radial and transverse flexibility. The deep lateral sections $14_2$ are also made from an anisotopic rubbery mixture whose modulus of elasticity is very high in the circumferential direction, but this mixture may be less anisotropic than that from which the central strip is formed and may thus have a high modulus of elasticity in the transverse direction as well.

Figure 3:
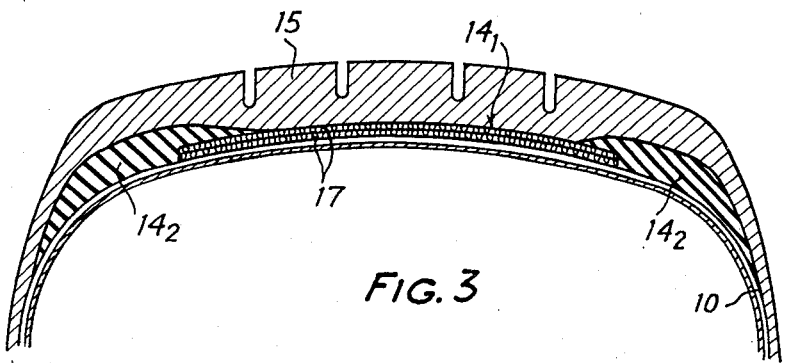

As a modification, the shallow central section $14_1$ of the breaker may be formed by one or a small number of layers of flexible filaments which are orientated in a circumferential direction or which form angles of less than 20° with the equatorial plane of the tire. This modification is shown in FIG. 3. In this case the central section $14_1$ is formed by two layers of filaments 17 which may extend into the deep lateral sections $14_2$ in order to provide a better connection with the latter. Given that in this case the resistance of the central section to circumferential extension is provided mainly by the filaments in layers 17, it may be beneficial, in order to ensure that the central section still has satisfactory radial and transverse flexiblity, to embed the filaments in these layers in an ordinary rubbery mixture having a low modulus of elasticity of the order of 15 to 20 kg/cm² at 100 percent extension. With the same object, the filaments in layers 17 may be moved apart so that they are not contiguous as they are in normal filament layers.

Figure 4:
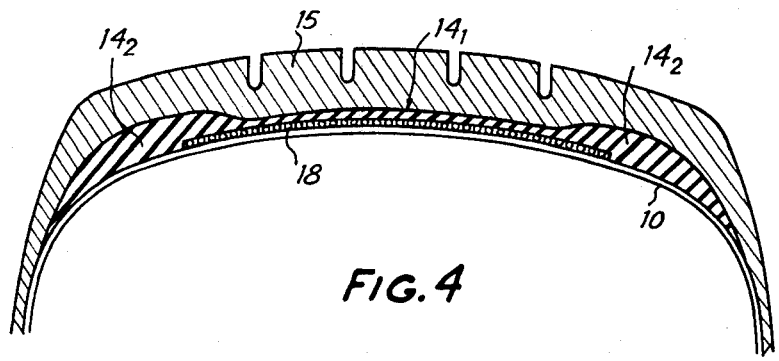

FIG. 4 shows another modification similar to the one above in which the central section $14_1$ of the breaker contains a layer 18 of circumferentially orientated filaments which forms a shallow and flexible strip which is embedded in the lower face of a shaped strip similar to the shaped strips in FIG. 1, made of anisotropic rubber having a high modulus of elasticity. The layer of filaments 18 is in direct contact with the central section of the crown of the carcass 10. It may extend at the edges into the deep lateral sections $14_2$. The filaments in this layer 18 may also be spaced apart and may be calendered with a relatively soft rubbery mixture.

Figure 5:
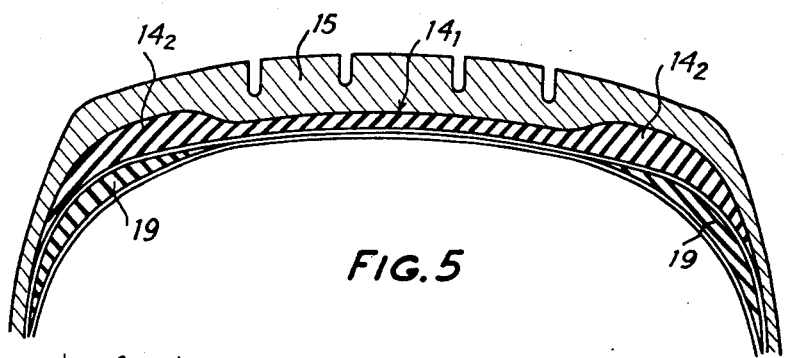

FIG. 5 shows another modification in which the breaker 14 with its deep lateral edges $14_2$ is associated with shaped strips of rubber 19 postioned underneath the deep lateral sections, that is to say at the point at which the shoulders of tire are situated. These strips 19 are situated either on the inside of the carcass 10, or else between two layers of the carcass when the carcass contains a number of layers. These strips 19 may also be used in the preceding embodiments.

With the shapes of breaker according to the invention, with their shallow central section and deep lateral sections, the quadratic transverse moment relative to the equatorial plan of the tire is much higher than with conventional tires where the depth in question is uniform across the whole width. When used in low-profile tires, breakers of this form enable the handling qualities of such tires to be substantially improved, in particular on high speed vehicles. The response of such tires to stresses caused by changes of direction is much faster, they keep a much more steady line at high speed, and they are much more resistant to fatigue and to failure at the edges of the belt when used for long runs at high speed. For its part, the shallow, transversely flexible central section makes the tire better able to absorb transverse dynamic stresses set up by the steering, which gives better road-holding when cornering. The radial flexibility of the central section of the breaker also gives a better high-speed ride over poor roads.

Figure 6:
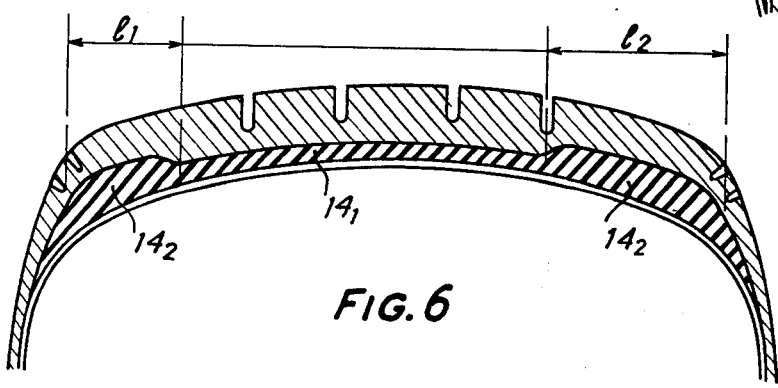
Figure 7:
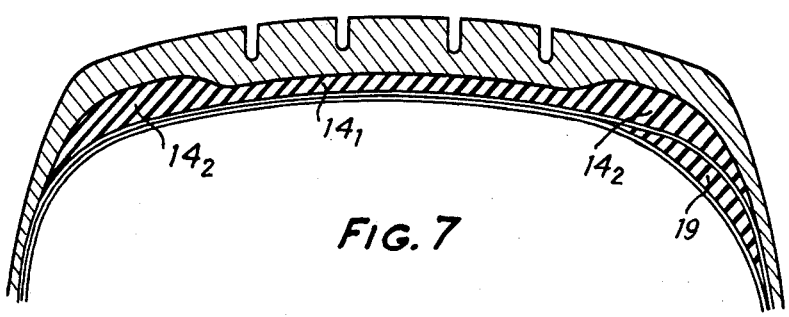

Other embodiments may be inferred from the examples described above. Thus, FIG. 6 shows a cross-section through the crown of a tire similar to that in FIG. 1 but in which the deep lateral sections $14_2$ of the breaker are of different widths $1_1$ and $1_2$, the wider deep section $1_2$ being situated on the same side as the shoulder which is on the outside when the tire is fitted to a vehicle. The radial stiffness of the tire is thus higher on the outside, which improves the vehicle's road-holding when cornering. A similar result may be achieved by using a single shaped strip 19 of high modulus rubber positioned under that deep lateral section $14_2$ which is situated on the outside of the tire when the tire is fitted to the vehicle, this being shown in FIG. 7.

Figures 8, 9:
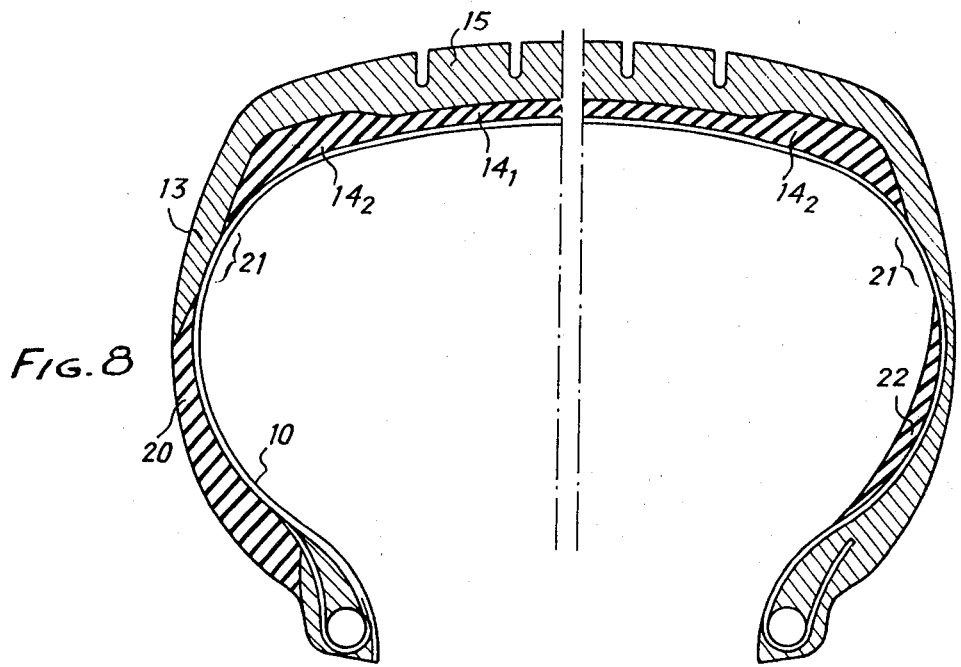

FIGS. 8 and 9 show two cross-sections of halves of tires, in which the breaker, which has deep edges $14_2$ according to one or other of the embodiments of the invention, is associated with at least one band of a rubbery mixture having a high modulus of elasticity which is situated in the lower part of the side-walls, the effect of such bands being to increase the transverse stiffness of the side-walls and thus the lateral stability of the tire. In the case of FIG. 8, this band 20 is positioned outside the carcass 10 and takes the place of the lower section of the normal side-wall band 13, over an area between the beads and approximately half the depth of the tire in cross-section. A more flexible zone 21 is formed between this band 20 and the deep edge $14_2$ of the belt, this zone being formed by the corresponding part of the carcass 10 which is coated at this point with a rubbery mixture having the same relatively low modulus of elasticity as the side-wall bands, i.e. approximately 15 kg/cm² at 100% extension. When the tire is in use, the flexible movement of the side-walls is restricted mainly to this flexible hinge zone 21. In the case of FIG. 9, the standard side-wall band 13 is retained and the strip of high modulus rubber 22 is added to the inside face of the carcass 10 while leaving a similar hinging zone 21 in this case also. The tire constructions shown in FIGS. 8 and 9 may be symmetrical or assymetrical and in the latter case the high modulus rubber strip 20 or 22 is preferably positioned on the side of the tire nearer the outside of the vehicle.

Where the strips for stiffening the side-walls such as 20 or 22 are separate from the deep lateral sections $14_2$ of the breaker 14 or the shoulder strips 19, they may be made from a rubbery mixture the composition and/or elastic properties of which are slightly different from those of the latter. The modulus of elasticity of the strips 20 or 22 is nevertheless relatively high, that is to say it is of the order of 40 to 80 kg/cm² at 100% extension, in order to give the side-walls of the tire the required transverse stiffness.

Figure 10:
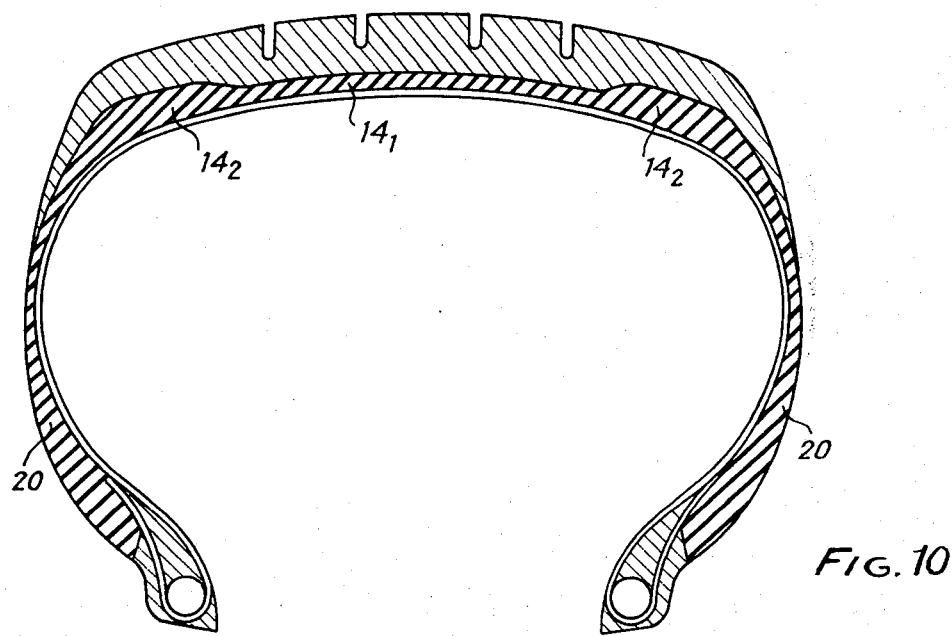

The strips 20 may however join up with the deep edges of the breaker and form a whole with these, in which case they may be formed from the same anisotropic rubbery mixture as edges $14_2$. A particular instance of this feature is shown in FIG. 10 in which it can be seen that the side-wall bands 20 extend into the deep edges $14_2$ although they narrow in the area situated between the shoulders and the largest cross-sectional width so as to form a preferred area for the side-walls to flex at this point. If the breaker 14 is itself formed from the rubbery mixture throughout, as in FIG. 1, the whole of the beaker 14 and the reinforced side-wall bands 20 may be formed from a single strip which is obtained by extrusion for example. In another modification which is not shown, the internal reinforcing bands 22 in FIG. 9 might join up with shoulder strips such as the strips 19 in FIG. 5 via an intervening narrow section.

The rubbery mixtures used for the deep lateral sections $14_2$ of the breaker and possibly for the central section $14_1$, as well as for the shaped shoulder strips 19, are anisotropic mixtures of a homogenous or relatively homogeneous appearance whose moduli of elasticity are very high in the vulcanised state, at least in the circumferential direction of the tire, that is to say their strength and resistance to extension is much higher than those of conventional mixtures currently used in the tire industry. Their high strength is expressed in particular by their moduli of elasticity at low extensions, these being more representative of the conditions under which the mixtures operate in the tire, and it is assumed here that such moduli of elasticity in the circumferential direction need to be considerably better than 15 kg/cm² for an extension of 10%. Strengths of this order may be achieved by incorporating in the rubbery mixtures special fillers having high strengthening characteristics and/or fine textile, metal or glass fibers. Very fine fibers of glass, nylon or cotton with a diameter of the order of 0.03 mm and a length diameter ratio at least 10 to 1 may, for example, be incorporated fairly easily in the rubber to give mixtures of relatively homogenous appearance in which the fibers form an extremely strong reinforcing network. The special fillers with high strengthening characteristics may in particular be polyolefins having a high molecular weight equal to or greater than approximately 500,000, such as polyethylene or isotactic polypropylene.

On the other hand, as mentioned above, it is desirable that the strength of the rubbery mixtures be high only in the circumferial direction of the breaker, its modulus in the transverse direction then being lower in order to retain good transverse flexibility. Such anisotropic mixtures can fairly easily be obtained by masticating them on machines such as mixing mills or by shaping them in an extrusion die so as to give the particles of polyolefin and/or the fine fibers incorporated in the said mixtures a specific longitudinal orientation.

Examples of suitable rubbery mixtures are given below:

Example 1

To form the deep, shaped strips $14_2$ of the breaker, a rubbery mixture is used which contains from 40 to 80 parts by weight of carbon black and from 25 to 40 parts of isotactic polypropylene having a molecular weight equal to or greater than 500,000 to 100 parts of natural rubber. The mixture is worked hot at 170°C in a Bambury mixer and is then transferred to a mixing mill for the vulcanising agents to be mixed in. The mixture is formed into shaped strips $14_2$ which are used to form the lateral sections of the breaker 14. Once vulcanised, the modulus of elasticity of the mixture in the longitudinal direction at 10% extension is of the order of 30 to 60 kg/cm², depending upon the content of reinforcing fillers. The modulus of elasticity in the transverse direction is approximately 3 times less, being around 10 to 30 kg/cm².

As a modification, from 5 to 10% of fine textile fibers may be added to mixtures of this sort in order to achieve higher moduli mainly in the circumferential direction.

Example 2

To form the shallow central section $14_1$ and the deep lateral sections $14_2$ of the breaker, or to form the whole of the strip forming the breaker, a rubbery mixture is used which contains from 40 to 80 parts by weight of carbon black and from 10 to 50 parts by weight of polyethylene having a molecular weight of approximately 800,000 to 100 parts of natural or synthetic rubber. The mixture is worked hot on a mixing mill at appropriately 150°C and the vulcanising agents are added towards the end of the operation. Strips are removed from the mixer and cooled under tension and these strips are then used to form the central section and/or the lateral sections of the breaker. Once vulcanised in the tire, the longitudinal modulus of elasticity at 10% extension of the strips is of the order of 1000 to 2000 kg/cm² and their transverse modulus of elasticity at 100% extension is of the order of only 30 kg/cm², which is to say that there is a very high degree of anisotropy.

I claim:

1. A low-profile vehicle tire whose cross-sectional proportions of height to width do not exceed 0.8 to 1, comprising a carcass having side-walls and a crown, a tread and an inextensible reinforcing breaker positioned between said carcass crown and said tread, said breaker extending transversely for a width at least equal to the width of said tread and having a shallow central section and two deep circumferentially continuous lateral sections, said shallow central section of said breaker having a width between half and two-thirds of the width of said tread, and a depth which is substantially uniform and is not greater than three times the depth of said carcass crown, and wherein at least said lateral sections of said breaker are made of an anisotropic rubbery mixture having a very high modulus of elasticity in the circumferential direction of said tire, said modulus of elasticity being greater than 15 kg/cm² at 10% extension, and being at least three times greater than the modulus of elasticity in the other, transverse and radial directions of the tire, the depth of said lateral sections of said breaker being two to three times the depth of said central section of said breaker.

2. A tire according to claim 1, wherein said shallow central section of said breaker also is made of an anisotropic rubbery mixture having a very high modulus of elasticity in the circumferential direction, being greater than 15 kg/cm² at 10% extension, said modulus being at least three times greater than the modulus of elasticity in the other transverse and radial directions of the tire.

3. A tire according to claim 2, wherein shallow central section and deep lateral sections of said breaker are formed by a single shaped strip made throughout from the same anisotropic rubbery mixture having a modulus of elasticity in the circumferential direction of said tire which is greater than 15 kg/cm² at 10% extension said modulus being at least three times greater than the modulus of elasticity in the other, transverse and radial directions of the tire.

4. A tire according to claim 1, wherein said shallow central section of said breaker contains up to two layers of flexible filaments lying in a substantially circumferential direction which are embedded in a layer of rubbery mixture having a low modulus of elasticity.

5. A tire according to claim 1, wherein one of said deep circumferential continuous lateral sections of said breaker is wider than the other said lateral section.

6. A tire according to claim 1, which further contains at least one shaped strip of rubbery material which has a high modulus of elasticity in the circumferential direction and which is located underneath the outside layer of said carcass at the point at which the shoulder of said tire is situated.

7. A tire according to claim 1, wherein at least one of said side-walls of said carcass is covered with a stiffening band made of a rubbery mixture having a high modulus of elasticity, a flexible bending zone being left at the upper part of said side-wall.

8. A tire according to claim 1, wherein said deep lateral sections of said breaker each merge with side-wall stiffening bands via a thin section which forms a bending zone, the said side-wall stiffening bands being formed throughout from the same anisotropic rubbery mixture having a very high modulus of elasticity in the circumferential direction.

9. A tire according to claim 1, wherein said anisotropic rubbery mixture having a very high modulus of elasticity contains a reinforcing filler at least part of which is formed by a polyolefin of very high molecular weight the modulus of elasticity of said mixture being higher than 15 kg/cm$^2$ at 10% extension in the circumferential direction of said breaker and at least three times greater than the modulus of elasticity in the other transverse and radial, directions of the breaker.

* * * * *